(12) United States Patent
Chandra et al.

(10) Patent No.: US 10,248,987 B1
(45) Date of Patent: Apr. 2, 2019

(54) USING DIGITAL ITEM TRACKING TO DRIVE E-COMMERCE

(71) Applicant: Poshmark, Inc., Menlo Park, CA (US)

(72) Inventors: Manish Chandra, Fremont, CA (US); Nghia Bui, San Jose, CA (US); LyAnn Chhay, San Mateo, CA (US); Gautam Golwala, Sunnyvale, CA (US); Chetan Pungaliya, Fremont, CA (US); Tracy Sun, San Francisco, CA (US)

(73) Assignee: Poshmark, Inc., Menlo Park, CA (US)

( * ) Notice: Subject to any disclaimer, the term of this patent is extended or adjusted under 35 U.S.C. 154(b) by 565 days.

(21) Appl. No.: 14/217,255

(22) Filed: Mar. 17, 2014

Related U.S. Application Data (60) Provisional application No. 61/794,013, filed on Mar. 15, 2013.

(51) Int. Cl.
    *G06Q 40/00*      (2012.01)
    *G06Q 30/06*      (2012.01)

(52) U.S. Cl.
    CPC ................ *G06Q 30/0635* (2013.01)

(58) Field of Classification Search
    USPC ....................................... 705/26.1
    See application file for complete search history.

(56) References Cited

U.S. PATENT DOCUMENTS

| | | | |
|---|---|---|---|
| 7,099,933 B1 | 8/2006 | Wallace et al. | |
| 7,725,366 B1 | 5/2010 | Franco | |
| 7,818,392 B1 | 10/2010 | Martino et al. | |
| 7,848,961 B2 * | 12/2010 | Estes ................ | G06Q 10/08 705/26.1 |
| 9,786,001 B2 | 10/2017 | Abraham et al. | |
| 2002/0007292 A1 | 1/2002 | Paxton et al. | |
| 2002/0046157 A1 | 4/2002 | Solomon | |
| 2002/0053029 A1 | 5/2002 | Nakamura et al. | |
| 2002/0087465 A1 * | 7/2002 | Ganesan ............. | G06Q 20/10 705/39 |
| 2006/0282304 A1 | 12/2006 | Bedard et al. | |
| 2007/0095904 A1 * | 5/2007 | Barta ................ | G06Q 10/08 235/384 |
| 2008/0255942 A1 | 10/2008 | Craft | |
| 2009/0157479 A1 | 6/2009 | Caldwell et al. | |
| 2009/0164333 A1 * | 6/2009 | Rothman ............. | G06Q 10/08 705/26.1 |
| 2009/0254971 A1 | 10/2009 | Herz et al. | |
| 2009/0265255 A1 | 10/2009 | Jackson et al. | |
| 2009/0282125 A1 | 11/2009 | Jeide et al. | |
| 2010/0169163 A1 * | 7/2010 | Alvin ................. | G06Q 10/087 705/38 |

(Continued)

OTHER PUBLICATIONS

Montgomery, Alan L., et al. "Modeling online browsing and path analysis using clickstream data." Marketing science 23.4 (2004): 579-595.*

*Primary Examiner* — Mark Holcomb
(74) *Attorney, Agent, or Firm* — Patent Law Works LLP (57) ABSTRACT

A digital item tracking system drives e-commerce with an order state that is determined based on processing events, shipping events and payment events. When a transaction occurs in a peer-to-peer marketplace the order state is updated as events occur through the point that an order is accepted by a buyer. The order can also cause an exception in which reverse digital item tracking is needed.

21 Claims, 7 Drawing Sheets

(56) References Cited

U.S. PATENT DOCUMENTS

| | | |
|---|---|---|
| 2010/0205541 A1 | 8/2010 | Rapaport et al. |
| 2011/0087731 A1 | 4/2011 | Wong et al. |
| 2012/0209970 A1 | 8/2012 | Scipioni et al. |
| 2012/0284145 A1 | 11/2012 | Kalin et al. |
| 2013/0030879 A1 | 1/2013 | Munjal |
| 2013/0073473 A1 | 3/2013 | Heath |
| 2014/0046794 A1 | 2/2014 | Vallery et al. |
| 2014/0108149 A1 | 4/2014 | Jabara et al. |
| 2014/0129390 A1 | 5/2014 | Mauge et al. |
| 2014/0136432 A1 | 5/2014 | Fallows |
| 2014/0207611 A1 | 7/2014 | Cleary et al. |
| 2014/0279049 A1 | 9/2014 | Wiseman et al. |
| 2015/0012332 A1 | 1/2015 | Papachristos |
| 2015/0134540 A1 | 5/2015 | Law et al. |
| 2015/0219610 A1 | 8/2015 | Jackson, Jr. et al. |
| 2015/0310569 A1 | 10/2015 | Chong et al. |

\* cited by examiner

USING DIGITAL ITEM TRACKING TO DRIVE E-COMMERCE

CROSS-REFERENCE TO RELATED APPLICATIONS

This application claims the benefit of priority under 35 U.S.C. 119(e) to U.S. Application No. 61/794,013, filed Mar. 15, 2013, entitled "Using Digital Item Tracking to Drive E-Commerce," the contents of which are hereby incorporated herein by reference. This application is related to co-pending U.S. application Ser. No. 14/216,961 entitled Real-time User Generated Virtual Shopping Parties, having common inventors, the same assignee, and the same filing date as this application, the contents of which are hereby incorporated herein by reference. This application is also related to co-pending U.S. application Ser. No. 14/217,267 entitled Social Merchandising System, having common inventors, the same assignee, and the same filing date as this application, the contents of which are hereby incorporated herein by reference.

TECHNICAL FIELD

This disclosure pertains generally to e-commerce, and more specifically to using digital item tracking to drive e-commerce in peer-to-peer electronic marketplaces.

BACKGROUND

E-commerce through online marketplaces is thriving. When making a purchase online, several supporting vendors contribute to the transaction, such as a warehouse storing physical items for sale, a payment processor to collect and distribute funds, and a transporter for delivery of items. These entities often operate external to and independently of a marketplace, resulting in isolated processes and distributed information adhering to varying formats.

Peer-to-peer marketplaces are a segment of e-commerce in which nearly any individual with access to a networked computing device can become a seller in addition to a buyer, even for selling a single item. Individuals typically do not have access to the resources of larger entities, and lack policies and procedures of an established distribution point. Further, individuals are not trusted as much an established business. Therefore, some Internet shoppers are less likely to buy from a peer-to-peer marketplace in which results after a sale can vary widely.

What is needed is an integrated approach to order processing, payment processing and delivery of items in e-commerce transactions. Further, the technique should be event driven in order to integrate multiple vendor systems involved in executing an e-commerce transaction involving physical items.

SUMMARY

The present invention addresses the shortcomings of the prior art by providing methods, computer readable mediums, and computing devices for using digital item tracking to drive e-commerce.

In one embodiment, an indication of a transaction from a peer-to-peer marketplace indicative that an item has been purchased by a buyer from a seller, along with details of the transaction is received. Access for the buyer and seller to a user interface can be provided in order to display an order state pertaining to a status of the item in substantially real-time, with respect to order processing, payment processing, and item delivery.

In another embodiment, an order state is transitioned to a first state when a shipping label for the item is printed by the seller. The shipping label can be generated according to the details of the transaction received from the marketplace. Responsive to the order state transitioning to the first state, a buyer is charged for the item according to the details of the transaction through a payment server. Further, the order state can be transitioned to a second state when an indication of receipt from a transport server indicative that the item has transferred possession from the seller to a shipper is received. In yet another embodiment, the order state is transitioned to a third state when an indication of delivery from the transport server indicative that the item has transferred possession from the shipper to the buyer is received. Responsive to the item transitioning to the third state, a payment can be released to the seller as charged to the buyer. The specific types of states and ordering are implementation specific.

The above Summary is not intended to be limiting as numerous additional embodiments are possible and are described in more detail in the Detailed Description.

DETAILED DESCRIPTION

Methods, computer readable mediums, and computing devices for using digital item tracking to drive e-commerce, are described.

A digital item tracking system working in conjunction with user operated mobile device apps provides a new, tightly integrated approach to peer-to-peer e-commerce which uses a single integrated system with payments, shipping and money movement from buyer to seller. This enables tracked shipping and other status information to drive the entire transaction from release of payment to return of items to handling lost and misplaced items. The tracking status can be used to release payment to the seller, provide a refund to the buyer and also compensate buyer and seller for lost items. In other words, tracking status can be used to drive an entire peer-to-peer marketplace e-commerce system. Digital item tracking can be used to ensure safe delivery, returns and exception handling in a scalable manner. The digital item tracking can be achieved using, for example, bar code scanners, RFID chips, or manual entry at various checkpoints as implemented by many logistics carriers including USPS, UPS and FedEx.

In operation, a system can issue a payment action responsive to the order state transitioning based on at least one of a shipping status and a processing status, initiate a shipping action responsive to the order state transitioning based on at least one of a payment status and a processing status, and facilitate a processing action responsive to the order state transitioning based on at least one of a shipping status and a payment status, as described more fully below.

Figure 1:
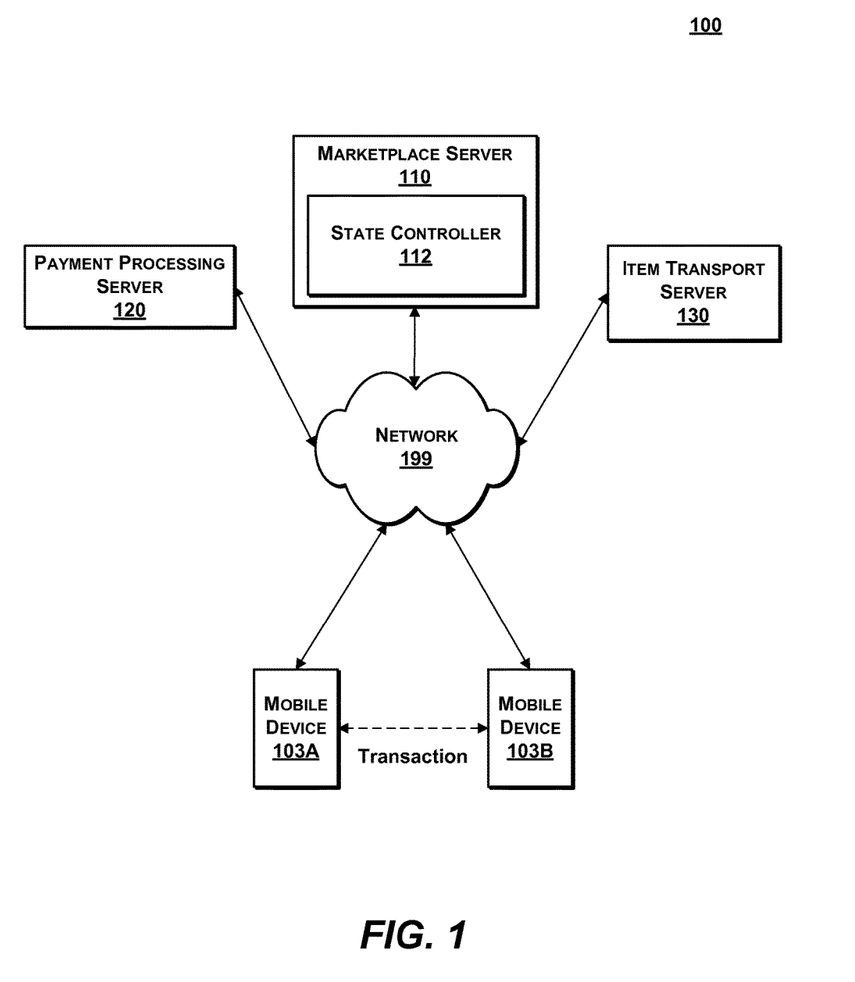
FIG. 1 is a high-level block diagram illustrating a digital item tracking system to drive e-commerce, according to one embodiment of the present invention.
Figure 2:
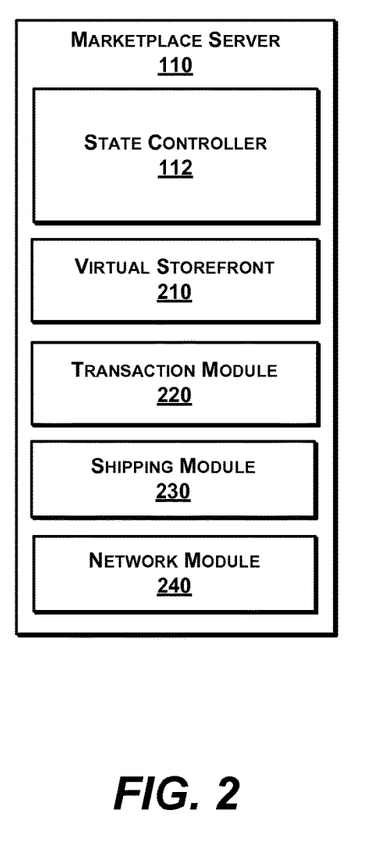
FIG. 2 is a more detailed block diagram of a marketplace server of FIG. 1, according to one embodiment of the present invention.
Figure 3A:
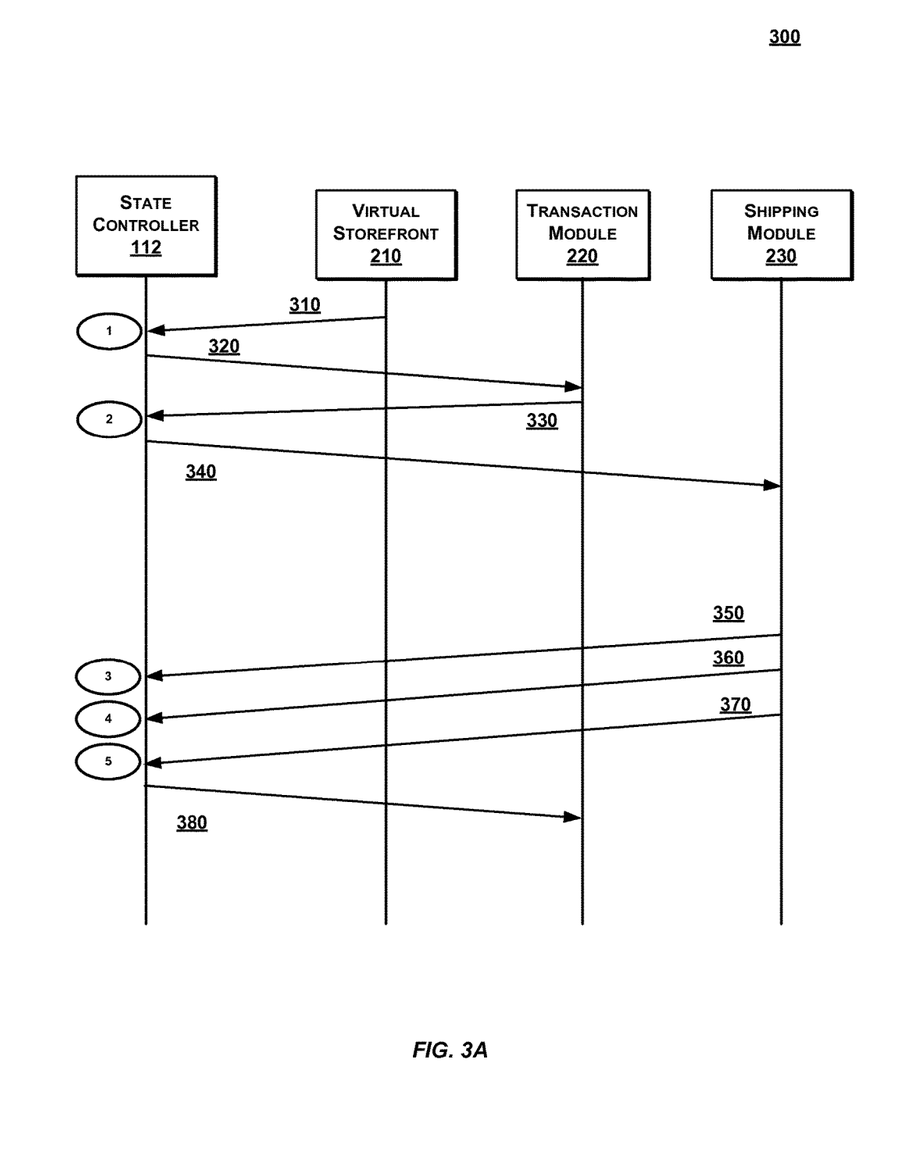
FIG. 3A is an interaction diagram illustrating exemplary interactions between components of FIG. 1 for item tracking using order states, according to one embodiment of the present invention.
Figure 3B:
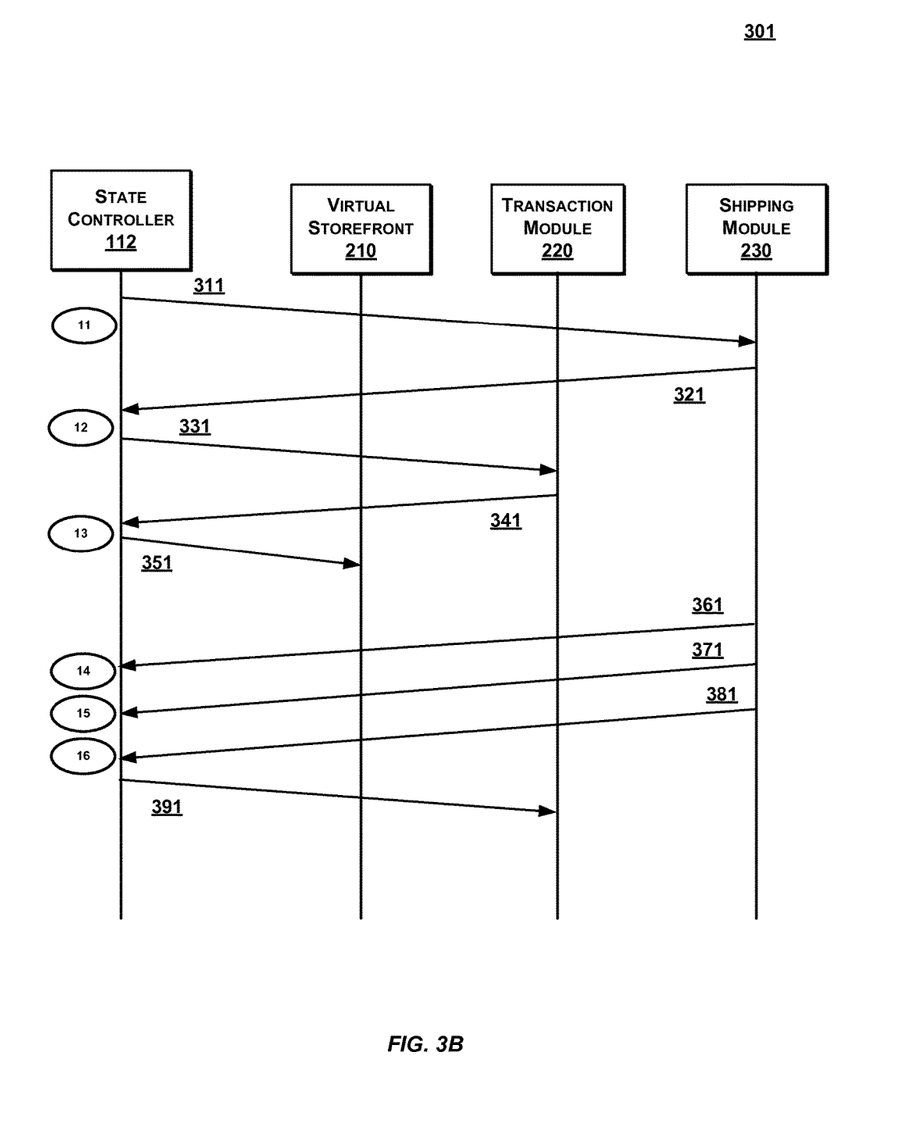
FIG. 3B is an interaction diagram illustrating exemplary interactions between components of FIG. 1 for return exception, item tracking using order states, according to one embodiment of the present invention.

Systems for Digital Item Tracking (FIGS. 1-3)

FIG. 1 is a block diagram illustrating an exemplary network architecture in which a digital item tracking system 100 can be implemented. The illustrated network architecture comprises multiple mobile communication devices 103A, 103B, connected to a network 199 which is also connected to a marketplace server 110, a payment processing server 120 and an item transport server 130. In FIG. 1, a state controller 101 is illustrated as residing on the marketplace server 110.

The marketplace server 110 comprises a state controller 112. It is understood that the marketplace server 110 is implementable in a server blade, desktop or mobile PC, a virtual application server, or any suitable processor-based environment. In one embodiment, the marketplace server 110 facilitates item tracking for transactions between peers. In one aspect, the marketplace server 110 hosts peer-to-peer shopping galleries, shopping parties, virtual storefronts, and the like. Buyers and sellers can log on to the marketplace server 110 to conduct transactions for various items and services. In another aspect, the marketplace server 110 uses back-end resources, including the payment processing server 120 and the item transport server 130, to execute the transaction and delivery. More specifically, one embodiment uses an order state to drive e-commerce. For example, a processed state, a shipped state, a delivery state, and an exception state are inputs that trigger certain actions by the state controller 112. Additional embodiments of the marketplace server 110 (i.e., FIG. 2) and its operations (e.g., FIG. 4) are described in more detail below.

Peer-to-peer marketplaces enable the buying and selling of products between various users. Such users can be individuals, small businesses or even large businesses. In a peer-to-peer marketplace, any user can choose to sell or buy from the marketplace, and can often play both roles. Peer to peer marketplaces have been traditionally structured with a variety of approaches and choices to each consumer from payment, pricing and shipping. For example, a marketplace where people are selling jewelry may give the buyer a choice of a variety of payments ranging from Visa, MasterCard and other credit cards as well as newer approaches to payment like PayPal. It may allow the seller to ship using a variety of shipping services, such as the US Postal Service, UPS or FedEx. Finally the money is typically directly paid to the seller by the buyer.

The mobile devices 103 can be implemented in any of the devices set forth for the marketplace serer 110. For example, a smart phone, tablet device or laptop computer, executing a mobile browser or a downloaded app can access the marketplace server 110 over an IP or a 4G communication channel. The mobile devices 103 display a user interface, allowing users to directly interface with the marketplace server 110.

The payment processing server 120 can be implemented in any of the devices set forth above. Available payment mechanisms on the payment processing server 120 can be credit or debit cards, electronic checks, electronic coupons or gift cards, wire transfers, or any other financial transactions across networks in support of transactions on the marketplace server 110. The payment processing server 120 can be any payment processing service whether or not actually connected to an ACH (Automated Clearing House) backbone. Exemplary payment processing services can be any suitable service such as those provided by PayPal, Amazon Payments, online Visa, Master Card and American Express services, Western Union, QuickBooks, Google Checkout, and the like. The payment processing server 120 operating on the back-end of the network architecture can be invisible to a buyer and seller who preferably interact with a single user interface of the marketplace serer 110. In some embodiments, the payment processing server 120 processes payments responsive to a change in order states, for example, a payment can be charged to a buyer responsive to a shipped state, and a payment can be released to a seller responsive to a delivered state.

The item transport server 130 is also implementable in any of the devices described above. The item transport server 130 can be in communication with one or more external transport system databases, managed by entities such as the US Postal Service, UPS, Federal Express, DHL, PO box providers, and the like. The item transport server 130 can use RFID tags, scanners, satellite networks, and other resources to track an item from when the label is printed by a seller until delivered and accepted by a buyer. Intermittent statuses are variable, and can include data such as location, date, time, expected arrival times, actual arrival times, and more. In some embodiments, the item transport server 130 operates as an input to the marketplace server 110 for transitioning order states based on changes in transport data.

In general, mobile communication devices 103 and servers 110, 120, 130 can be implemented using computer systems 210 such as the one illustrated in FIG. 6 and described below. The mobile communication devices 103 and servers 110, 120, 130 are communicatively coupled to the network 199, for example via a network interface such as a WiFi card and/or software. Mobile communication devices 103 are able to access applications and/or data on servers 1110, 120, 130 using, for example, a web browser or other client software (not shown). It is to be understood that this is an example only, and in various embodiments various functionalities of the digital item tracking system 100 can be distributed between multiple computing devices as desired.

In a more general sense, functionalities of components described herein can be distributed between multiple computer systems, including within a cloud-based computing environment in which the functionality in question is provided as a service over a network. It is to be understood that although the mobile device app and the digital item tracking system 100 are illustrated in FIG. 1 as single entities, these components represent collections of functionalities, which can be instantiated as single or multiple modules as desired.

It is to be understood that the modules of the mobile device app and of the digital item tracking system 100 can be instantiated (for example as object code or executable images) within the system memory (e.g., RAM, ROM, flash memory) of any computer system, such that when the processor of the computer system processes a module, the computer system executes the associated functionality. As used herein, the terms "computer system," "computer," "client," "client computer," "server," "server computer" "mobile communication device" and "computing device" mean one or more computers configured and/or programmed to execute the described functionality. Additionally, program code to implement the functionalities of the digital item tracking system 100 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

In one embodiment, a mobile device app is in the form of an iOS app for an iPhone, iPad, iPod touch or other similar mobile device. In other embodiments, a mobile device app can be in the form an app written for a different mobile operating system, such as Android, Windows Phone, Blackberry OS, etc. Clients in the form of laptops or desktops can run applications written for their corresponding operating systems (e.g., Windows, Mac OS, Linux, etc.).

FIG. 2 is a more detailed block diagram of a marketplace server 110 of FIG. 1, according to one embodiment of the present invention. The marketplace server 110 includes the state controller 112 in addition to a virtual storefront 210, a transaction module 220, a shipping module 230, and a network module 240. These components can be implemented in hardware, software (e.g., as stored on a non-transitory computer readable medium), or a combination of both. In various embodiments, the functionalities can be grouped into different components, or be distributed across various computing devices.

The state controller 112 receives inputs that can result in a transition of an order state, in one embodiment. In response, to either the transition or just to the order state, the state controller 112 can automatically perform specific actions (e.g., pull and push information). In this manner, an order state resulting from digital tracking of an item drives e-commerce transactions. In one embodiment, the state controller 112 operates according to a finite state machine wherein actions are taken based on a current state, or a transition to or from the current state. The state controller 112 can be integrated with the virtual storefront 210 and managed by a single entity, in one embodiment, and the state controller 112 can be a separate entity serving multiple independent virtual storefronts, in another embodiment.

One embodiment provides a user interface so that a buyer, a seller, and a marketplace administrator can access order states for items. Buyers and sellers can track all orders on a single screen from a table of items and order states, along with state details and other information. Pending events for triggering a new state can be shown as well as resulting actions. In an embodiment, an administrator can log-in and change events, order states, and responsive actions for an entire system, a buyer or seller, a type of transaction, a type of item, or a single transaction, as examples. Exemplary order states, and interactions during transitions for an item tracked from purchase to acceptance are illustrated in FIG. 3A. Exemplary states and transitions for an exception raised by an item are illustrated in FIG. 3B.

The virtual storefront 210 can be a digital gallery of products made available for peers who can be buyers and sellers, or vice versa. An item can be selected and moved to a shopping cart as a cache of intended purchases. The virtual storefront 210 can provide a checkout at which point delivery information and financial information is input to form fields. A transaction number (e.g., a unique transaction number) can be assigned. Confirmation of a purchase can cause a state change as discussed herein. In turn, the state change can cause a seller to be charged.

The transaction module 220 can facilitate financial transactions on behalf of the virtual storefront 310, with resources such as the payment processing server 120. Driven by state changes from the state controller 112, in some embodiments, the transaction module 220 charges a buyer, credits a seller, refunds a buyer, de-debits a seller, and more. In an embodiment, the transaction module 220 stores APIs enabling communication with back end resources such as log-ins to a bank account or PayPal account. The transaction module 220 can also have access to user accounts in order to retrieve stored financial information. Confirmation of funds sent, received, or escrowed can result in a state change as discussed herein. In response, the state change can cause additional actions, such as generation of a shipping label.

The shipping module 230 communicates with digital shipping systems, for example, the item transport server 130. An item is physically moved from a warehouse or other origin to a residence or other destination, is monitored at various checkpoints or continually. A shipping label generated by the shipping module 230 is triggered by a certain state at the state controller 112. The same shipping label can be scanned along an intermodal route by hand held devices, or an attached RFID chip can be sensed at checkpoints. Once delivered, the shipping label is scanned by a driver for a final update. Optionally, a buyer can enter numbers from the shipping label, or select an item from a user interface, as acceptance of the item as agreed for the final update.

A shipping label generated by the shipping module 230 can include transaction details reformatted for shipping. For instance, a name and address of a buyer and a seller can be formatted into a delivery person and address, and a return person and address on the shipping label. Moreover, a bar code can be embedded with a transaction number or even information about the contents of a package. In another embodiment, an RFID chip can be programmed and added to the label.

The network module 240 includes low-level communication software and/or hardware necessary for communication across a medium, and with resources connected to the medium. For example, the network module 240 can represent packet generators used to packetize application data into packets for transport across a wireless data connection, a WiFi card, APIs, or higher level software commands such as Java commands and specific software commands (e.g., scripts). More embodiments are set forth below with respect to FIG. 6.

FIG. 3A is an interaction diagram 300 illustrating exemplary interactions between components of FIG. 1 for delivery of an item, according to one embodiment of the present invention. It is understood that the interactions herein only illustrate a single embodiment, and that other embodiments can vary with regard to type, order and number of interactions.

At interaction 310, the virtual storefront 210 notifies the state controller 112 that a sale has been consummated. An order state transitions from state 0 to state 1 which in this case represents a processed or processing state. At interaction 320, in response to the transition, the transaction module 220 (which communicates with the payment processing server 120) is sent parameters for charging a buyer. At interaction 330, the transaction module 220 sends a confirmation and details concerning the charge. Updates can also affect a user profile (e.g., a gift card balance). The order state at this point can be updated from state 1 to state 2 indicative of a paid/waiting to ship state. At interaction 340, responsive to the transition of the order state, the state controller 12 can send a notification to the shipping module 230 to generate a shipping label for a seller to use for physically transporting a sold item.

At interaction 350, a first shipping status can indicate that an item has been handed over from a seller to a shipping entity. For example a labeled package containing an item can be scanned by a hand scanner when dropped off or deposited to a mail box. The order state correspondingly transitions from state 2 to state 3 which is representative of a shipped state. At interaction 360, a shipping status is updated by the shipping module 230 (which communicates with the item transport server 130), for example, when loaded to an airplane and when unloaded from the airplane, when departing from a sending sorting center and when arriving at a receiving sorting center, or when being transferred from a train to a truck. Various labels can be used to represent a transition from state 3 to state 4. At interaction 370, a shipping status update sent from the shipping module 230 to the state controller 112 indicates that an item has been delivered. In turn, the order state transitions from state 4 to state 5 to represent a delivered state. Additional interactions, such as buyer acceptance, are possible.

FIG. 3B is an interaction diagram 301 illustrating exemplary interactions between components of FIG. 1 for return of an item or other exception, according to one embodiment of the present invention. An exception occurs from an error with item processing, payment or transport. Items can be missing, damaged, mislabeled, mixed with another order, or returned for any other reason for a particular implementation. A system can automatically detect and initiate the exception, or alternatively, a buyer or seller can recognize the problem. Additional types of exceptions are discussed below with respect to FIG. 5.

At interaction 311, in response to an exception raised, the state controller 112 requests that the shipping module 230 generate a return shipping label. At interaction 321, the shipping module 230 notifies the state controller 112 that the shipping label has been generated and printed by a buyer, prior to return shipping. The order state transitions from 11 to 12 to indicate return processed/waiting to ship. At interaction 331, based on the transition, the state controller 112 requests that the transaction module 220 de-debit or otherwise retract funds sent to a seller. At interaction 341, when done, the order state is updated from state 12 to state 13. The virtual storefront 310 is then notified of the expected return for inventory purposes.

At interaction 361, the reverse trek continues with an indication from the shipping module 230 to the state controller 112 that the return shipping label has been scanned at a receiving post of a transit entity. The order state transitions from state 13 to state 14, a return shipped state. Shipping updates are sent at interaction 371, resulting in a transition from state 14 to state 15. At interaction 381, a delivery is reported and state 15 transitions to state 16 for a return delivered state. Finally, at interaction 391, the state controller 112 notifies the transaction module 220 that a refund can be dispatched to a buyer because the return exception process is complete.

In alternative embodiments covering different exception processes, one of ordinary skill in the art would understand application of the principles described herein to various types of exceptions. In one aspect, a wrong item exception or a damaged item exception requires interactions to return the incorrect item as well as a forward path of sending a replacement item. In another aspect, a missing item exception includes interactions along the forward path similar to the initial one, but with an updated shipping label.

Figure 4:
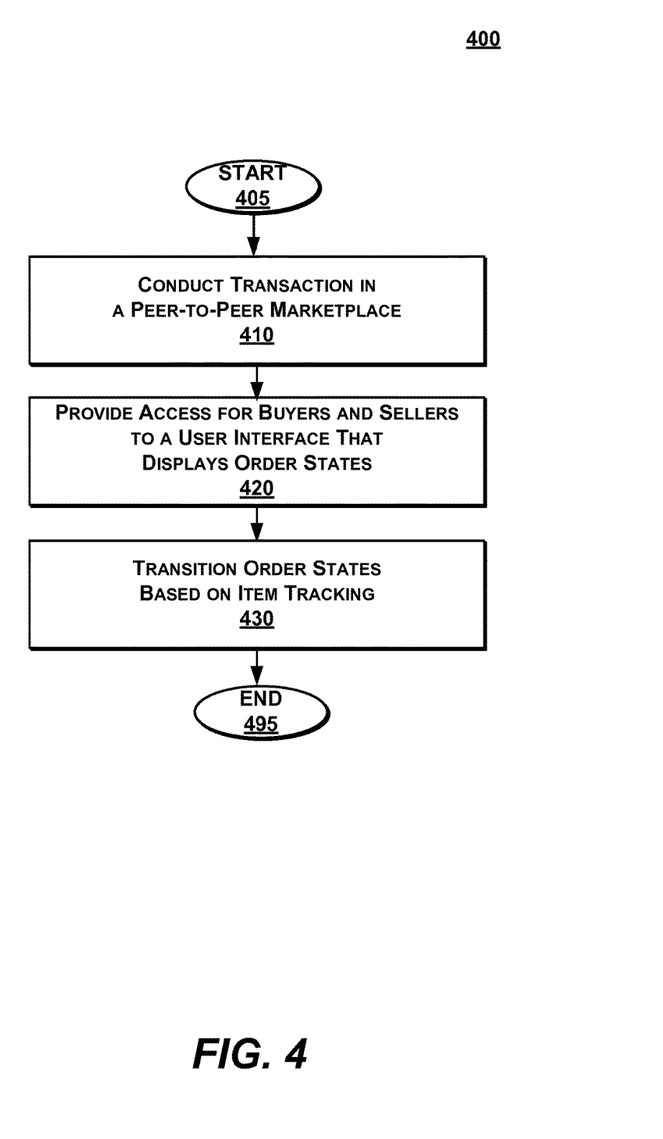
FIG. 4 is a high-level flow diagram illustrating a method for using digital item tracking to drive e-commerce, according to one embodiment of the present invention.
Figure 5:
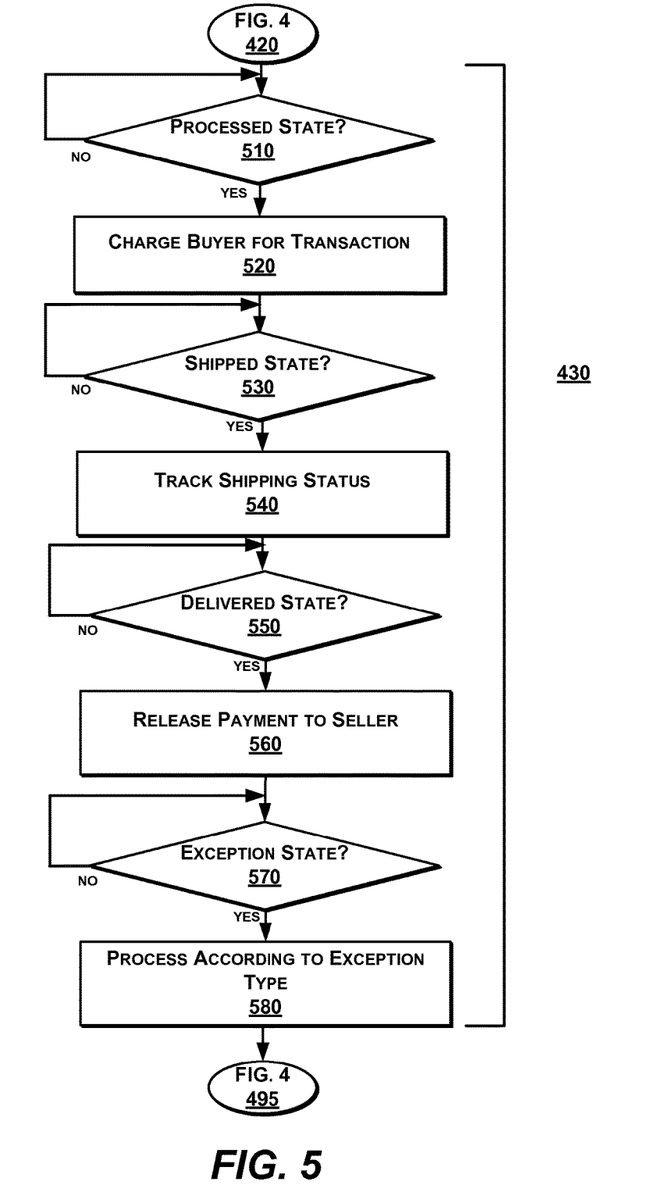
FIG. 5 is a more detailed flow diagram illustrating a step to transition order states based on item tracking of FIG. 4, according to one embodiment of the present invention.

Methods for Tracking Digital Items (FIGS. 4-5)

FIG. 4 is a high-level flow diagram illustrating a method 400 for using digital item tracking to drive e-commerce, according to one embodiment of the present invention. The method 400 can be implemented in, for example, the digital item tracking system 100, of FIG. 1.

At step 410, a transaction is conducted in a peer-to-peer marketplace. For example, the mobile devices 103A, B of FIG. 1 can conduct a peer-to-peer transaction for the sale of used sporting goods. The transaction of one embodiment is an online sale of an item. Personal items can be sold from a gallery of items discoverable through searching a database of items. A user profile can be accessed during the transaction in order to retrieve personal data for a buyer and a seller that are needed in the tracking process.

At step 420, access for buyers and sellers is provided to a user interface that displays order states. In the example, the buyer logs-in to see whether his debit card has been charged and when delivery can be expected, using a single application that aggregates back-end data sources to drive e-commerce. States can operate similarly to a finite state machine in which certain conditions trigger a transition from a current state to a subsequent state. Conditions at the subsequent state can vary from those at a prior state, so the next transition happens under a different occurrence of events. A buyer or a seller can log-in to a user profile from a user interface associated with the state controller 112. Database records can be accessed to generate a dynamic web page on the fly that lists items and corresponding order states. A user can click on various cells of the data to get additional data as a pop-up window, in a balloon, or the like.

At step 430, order states are transitioned based on item tracking. Also, actions are performed as a result of order state transitions. Returning a last time to the example, when the sporting goods arrive, the buyer can scan the shipping label with a smart phone or tablet device into a mobile app that automatically updates an order state to a delivered state. The resulting action in the example is that funds are released to the seller.

FIG. 5 is a more detailed flow diagram illustrating the step to transition order states based on item tracking of FIG. 4, according to one embodiment of the present invention.

At step 510, when an order state transitions to a processed state, a buyer is charged for a transaction, at step 520. At step 530, when the order state transitions to a shipped state, the shipping status is tracked, at step 540, as the item is transported from the seller to the buyer. At step 550, responsive to the order state transitioning to a delivered state, payment is released to the seller at step 560. At step 570, in response to the order state transitioning to an exception state, at step 580, a specific exception process is executed.

Figure 6:
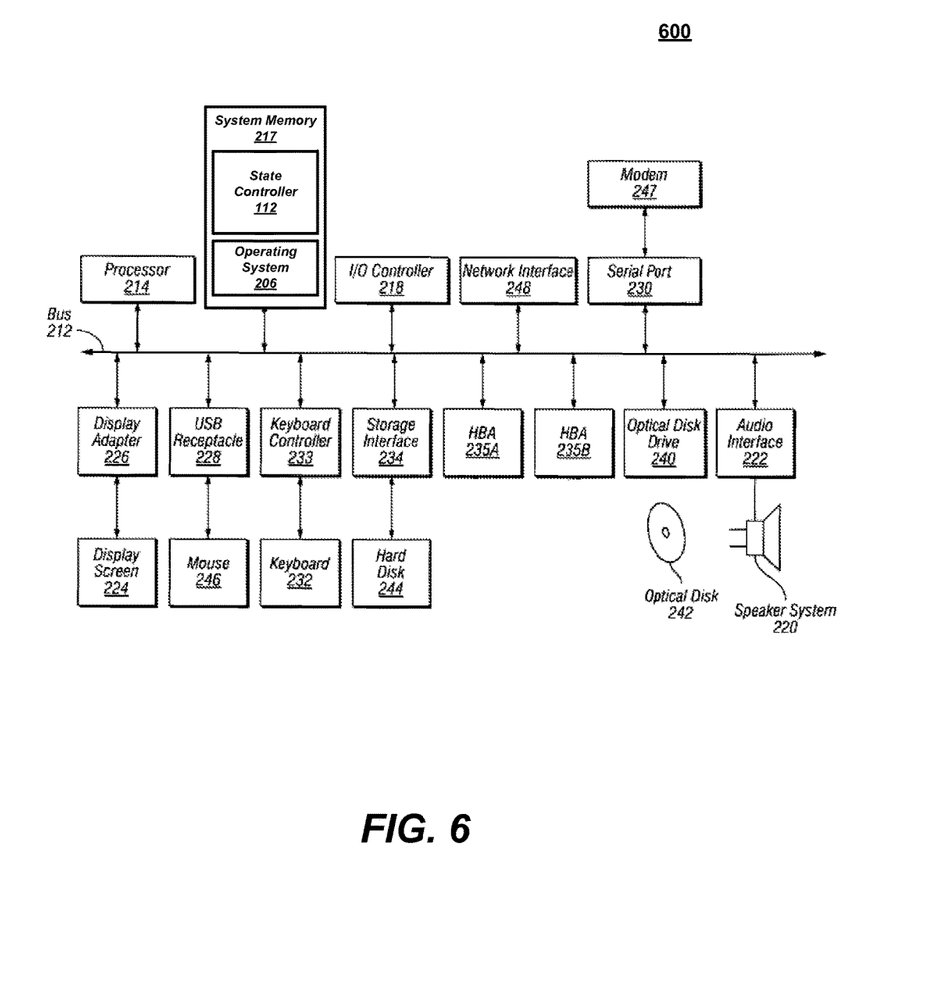
FIG. 6 is a block diagram illustrating a general computing system suitable for components described herein, according to one embodiment of the present invention The Figures depict various embodiments for purposes of illustration only. One skilled in the art will readily recognize from the following discussion that other embodiments of the structures and methods illustrated herein may be employed without departing from the described principles.

Generalities of the Disclosure (FIG. 6)

FIG. 6 is a block diagram of a computer system suitable for implementing the digital item tracking system 100 and its components. Mobile computing devices, other client computers, and servers can be implemented in the form of such computer systems 610. As illustrated in FIG. 6, the bus 612 communicatively couples other components of the computer system, such as at least one processor 604, system memory 617 (e.g., random access memory (RAM), read-only memory (ROM), flash memory), an input/output (I/O) controller 618, an audio output interface 622 communicatively coupled to an external audio device such as a speaker system 620, a display adapter 626 communicatively coupled to an external video output device such as a display screen 624, one or more interfaces such as serial ports 630, Universal Serial Bus (USB) receptacles 628, parallel ports (not illustrated), etc., a keyboard controller 633 communicatively coupled to a keyboard 632, a storage interface 634 communicatively coupled to at least one hard disk 644 (or other form(s) of magnetic media), an optical disk drive 640 configured to receive an optical disk 642, a mouse 646 (or other pointing device) coupled to the bus 612 e.g., via a USB receptacle 628, a modem 647 coupled to bus 612, e.g., via a serial port 630, and a network interface 648 coupled, e.g., directly to bus 612.

Other components (not illustrated) may be connected in a similar manner (e.g., document scanners, digital cameras, printers, etc.). Conversely, all of the components illustrated in FIG. 6 need not be present. The components can be interconnected in different ways from that shown in FIG. 6.

The bus 612 allows data communication between the processor 604 and system memory 617, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 644, optical disk 642) and loaded into system memory 617 and executed by the processor 604. Application programs can also be loaded into system memory 617 from a remote location (i.e., a remotely located computer system), for example via the network interface 648 or modem 647. In FIG. 6, the state controller 112 is illustrated as residing in system memory 617. An operating system (OS) 606 is also depicted as residing in the system memory 617. A mobile device app can also reside in system memory 617 of a computer system.

The storage interface 634 is coupled to one or more hard disks 644 (and/or other standard storage media). The hard disk(s) 644 may be a part of computer system, or may be physically separate and accessed through other interface systems.

The network interface 648 and or modem 647 can be directly or indirectly communicatively coupled to the network 199 such as the Internet. Such coupling can be wired or wireless.

As will be understood by those familiar with the art, the subject matter described herein may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the subject matter or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

We claim:

1. A computer-implemented method, in an order state server, for using digital item tracking to drive e-commerce in a peer-to-peer network marketplace accessible via a mobile communication device, the method comprising the steps of:

providing access to a single user interface for display on a mobile device, the single user interface including information about items listed by a seller on a peer-to-peer network marketplace, wherein an order state server aggregates back-end information from one or more back-end resources comprising an item transport server and a payment server and presents the back-end information for display to a buyer using the single user interface on the mobile device, the back-end resources being inaccessible to the buyer and the order state server stores application program interfaces enabling communication with the back-end resources;

receiving at a processor of the order state server, an indication of a transaction within the single user interface indicative that an item on the peer-to-peer network marketplace has been purchased by a buyer from the seller, along with details of the transaction entered into the single user interface displayed on the mobile device, the details of the transaction including payment information and delivery information from the buyer;

determining, using the processor of the order state server, an order state of a state controller of the order state server, the order state being associated with the item;

transitioning, using the state controller of the order state server, the order state using information received from the item transport server, the item transport server configured to track the item and provide an updated tracking status to the order state server;

transitioning, using the processor of the order state server, the order state of the state controller to a first state when the updated tracking status indicates that a shipping label for the item is ready to be printed by the seller;

reformatting, using the processor of the order state server, the details of the delivery information into a delivery address format compatible with the item transport server, the details of the delivery information comprising information previously entered by the buyer into the single user interface;

generating, using the processor of the order state server, the shipping label using the delivery information in the delivery address format, the shipping label being trackable by the item transport server;

outputting to the mobile communication device, intermittent statuses of the item based on information received from the item transport server;

automatically detecting, using the processor of the order state server, whether an exception event has occurred and responsive to detecting the exception event, initiating processing of the exception event by transitioning the order state to an exception state;

responsive to the order state transitioning to the first state, charging, using the processor of the order state server, a buyer for the item using the payment information entered by the buyer into the single user interface displayed on the mobile device, wherein the payment information is formatted by the order state server and sent to the payment server for processing and holding the processed payment information until the order state of the state controller has transitioned to a third state;

transitioning, using the processor of the order state server, the order state of the state controller to a second state when the updated tracking status indicates receipt from a transport server indicative that the item has transferred possession from the seller to a shipper;

transitioning, using the processor of the order state server, the order state of the state controller to the third state when the updated tracking status indicates delivery from the transport server indicative that the item has transferred possession from the shipper to the buyer; and responsive to the order state transitioning to the third state, releasing, using the processor of the order state server, a payment to the seller as charged to the buyer, the payment to the seller being processed by the payment server and being based on seller payment information retrieved from storage and being previously entered by the seller through a seller user interface on a seller's mobile device and stored under a seller profile.

2. The method of claim 1, wherein the order state is further based on one or more of a processing status, a shipping status, and a payment status.

3. The method of claim 1, further comprising at least one of:

initiating, using the processor of the order state server, a payment action responsive to the order state transitioning based on at least one of a shipping event and a processing event;

initiating, using the processor of the order state server, a shipping action responsive to the order state transitioning based on at least one of a payment event and a processing event; and initiating, using the processor of the order state server, a processing action responsive to the order state transitioning based on at least one of a shipping event and a payment event.

4. The method of claim 1, wherein the peer-to-peer network marketplace, the payment server, and the item transport server are each external to and independent of the order state server.

5. The method of claim 1:
wherein the exception event is indicative of a problem with the item or the transaction.

6. The method of claim 5, wherein transitioning the order state to the exception state comprises at least one of:

transitioning, using the processor of the order state server, the order state of the state controller to the exception state when a refund exception event occurs;

transitioning, using the processor of the order state server, the order state of the state controller to the exception state when a broken item exception event occurs; and transitioning, using the processor of the order state server, the order state of the state controller to the exception state when a wrong item exception event occurs.

7. The method of claim 1 further comprising:

responsive to the order state of the state controller transitioning from the third state to the exception state, generating, using the processor of the order state server, a return shipping label according to details of the transaction and the exception event.

8. The method of claim 7, further comprising:

transitioning, using the processor of the order state server, the order state of the state controller to a fifth state when an indication is received at the order state server that the return shipping label has been printed by the buyer; and responsive to the order state of the state controller transitioning from the exception state to the fifth state, retracting, using the processor of the order state server, funds sent to the seller for the item according to details of the transaction through the payment server.

9. The method of claim 8, further comprising:

transitioning, using the processor of the order state server, the order state of the state controller to a sixth state when an indication of receipt from the transport server indicative that the item has transferred possession from the buyer to the seller is received at the order state server.

10. The method of claim 9, further comprising:

transitioning, using the processor of the order state server, the order state of the state controller to a seventh state when an indication of delivery from the transport server indicative that the item has transferred possession from the shipper to the seller is received at the order state server; and responsive to the state controller transitioning to the seventh state, releasing, using the processor of the order state server, a refund to the buyer as retrieved from the seller through the payment server.

11. A non-transitory computer-readable medium storing computer executable instructions that, when loaded into computer memory and executed by at least one processor of a computing device, cause the computing device to perform a method in an order state server, for using digital item tracking to drive e-commerce in a peer-to-peer network marketplace accessible via a mobile communication device, the method comprising the steps of:

providing access to a single user interface for display on a mobile device, the single user interface including information about items listed by a seller on a peer-to-peer network marketplace, wherein the computing device represents an order state server that aggregates back-end information from one or more back-end resources comprising an item transport server and a payment server and presents the back-end information for display to a buyer using the single user interface on the mobile device, the back-end resources being inaccessible to the buyer and the order state server stores application program interfaces enabling communication with the back-end resources;

receiving, at a processor of the computing device, an indication of a transaction within the single user interface indicative that an item on the peer-to-peer network marketplace has been purchased by a buyer from the seller, along with details of the transaction entered into the single user interface displayed on the mobile device, the details of the transaction including payment information and delivery information from the buyer;

determining, using the processor of the order state server, an order state of a state controller of the computing device, the order state being associated with the item;

transitioning, using the state controller of the computing device, the order state using information received from the item transport server, the item transport server configured to track the item and provide an updated tracking status to the order state server;

transitioning, using the processor of the order state server, the order state of the state controller to a first state when the updated tracking status indicates that a shipping label for the item is ready to be printed by the seller;

reformatting, using the processor of the order state server, the details of the delivery information into a delivery address format compatible with the item transport server, the details of the delivery information comprising information previously entered by the buyer into the single user interface;

generating, using the processor of the order state server, the shipping label using the delivery information in the delivery address format, the shipping label being trackable by the item transport server;

outputting to the mobile communication device, intermittent statuses of the item based on information received from the item transport server;

automatically detecting, using the processor of the order state server, whether an exception event has occurred and responsive to detecting the exception event, initiating processing of the exception event by transitioning the order state to an exception state;

responsive to the order state of the state controller transitioning to the first state, charging, using the processor of the order state server, a buyer for the item using the payment information entered by the buyer into the single user interface displayed on the mobile device, wherein the payment information is formatted by the order state server and sent to the payment server for processing and holding the processed payment information until the order state of the state controller has transitioned to a third state;

transitioning, using the processor of the order state server, the order state of the state controller to a second state when the updated tracking status indicates receipt from a transport server indicative that the item has transferred possession from the seller to a shipper;

transitioning, using the processor of the order state server, the order state of the state controller to the third state when the updated tracking status indicates delivery from the transport server indicative that the item has transferred possession from the shipper to the buyer; and responsive to the order state transitioning to the third state, releasing, using the processor of the order state server, a payment to the seller as charged to the buyer, the payment to the seller being processed by the payment server and being based on seller payment information retrieved from storage and being previously entered by the seller through a seller user interface on a seller's device and stored under a seller profile.

12. The computer readable medium of claim 11, wherein the order state is further based on one or more of a processing status, a shipping status, and a payment status.

13. The computer readable medium of claim 11, wherein the method further comprises at least one of:
initiating, using the processor of the order state server, a payment action responsive to the order state of the state controller transitioning based on at least one of a shipping event and a processing event;
initiating, using the processor of the order state server, a shipping action responsive to the order state of the state controller transitioning based on at least one of a payment event and a processing event; and
initiating, using the processor of the order state server, a processing action responsive to the order state of the state controller transitioning based on at least one of a shipping event and a payment event.

14. The computer readable medium of claim 11, wherein the peer-to-peer network marketplace, the payment server, and the item transport server are each external to and independent of the order state server.

15. The computer readable medium of claim 11, wherein the exception event is indicative of a problem with the item or the transaction.

16. The computer readable medium of claim 15, wherein transitioning the order state to the exception state comprises at least one of:
transitioning, using the processor of the order state server, the order state of the state controller to the exception state when a refund exception event occurs;
transitioning, using the processor of the order state server, the order state of the state controller to the exception state when a broken item exception event occurs; and
transitioning, using the processor of the order state server, the order state of the state controller to the exception state when a wrong item exception event occurs.

17. The computer readable medium of claim 11, wherein the method further comprises:
responsive to the order state of the state controller transitioning from the third state to the exception state, generating, using the processor of the order state server, a return shipping label according to details of the transaction and the exception event.

18. The computer readable medium of claim 17, wherein the method further comprises:
transitioning, using the processor of the order state server, the order state of the state controller to a fifth state when an indication is received at the order state server that the return shipping label has been printed by the buyer; and
responsive to the order state of the state controller transitioning from the exception state to the fifth state, retracting, using the processor of the order state server, funds sent to the seller for the item according to details of the transaction through the payment server.

19. The computer readable medium of claim 18, wherein the method further comprises:
transitioning, using the processor of the order state server, the order state of the state controller to a sixth state when an indication of receipt from the transport server indicative that the item has transferred possession from the buyer to the seller is received at the order state server.

20. The computer readable medium of claim 19, wherein the method further comprises:
transitioning, using the processor of the order state server, the order state of the state controller to a seventh state when an indication of delivery from the transport server indicative that the item has transferred possession from the shipper to the seller is received at the order state server; and
responsive to the state controller transitioning to the seventh state, releasing, using the processor of the order state server, a refund to the buyer as retrieved from the seller through the payment server.

21. An object redemption server to associate unique redemption objects with mobile devices for secure redemption, comprising:
a processor; and
a memory, comprising:

a first component to provide access to a single user interface for display on a mobile communication device, the single user interface including information about items listed by a seller on a peer-to-peer network marketplace, wherein an object redemption server aggregates back-end information from one or more back-end resources comprising an item transport server and a payment server and presents the back-end information for display to a buyer using the single user interface on the mobile communication device, the back-end resources being inaccessible to the buyer and the object redemption server stores application program interfaces enabling communication with the back-end resources, the first component further configured to receive, at a processor of the object redemption server, an indication of a transaction within the single user interface indicative that an item on the peer-to-peer network marketplace has been purchased by a buyer from the seller, along with details of the transaction entered into the single user interface displayed on the mobile device, the details of the transaction including payment information and delivery information from the buyer;

a second component to determine, using the processor of the object redemption server, an order state of a state controller of the object redemption server, the order state being associated with the item and transitioning, using the state controller of the object redemption server, the order state using information received from the item transport server, the item transport server configured to track the item and provide an updated tracking status to the object redemption server, and to transition, using the processor of the object redemption server, the order state of the state controller to a first state when the updated tracking status indicates that a shipping label for the item is ready to be printed by the seller, and the shipping label being reformatted using the details of the delivery information into a delivery address format compatible with the item transport server, the details of the delivery information comprising information previously entered by the buyer into the single user interface and generated using the delivery information in the delivery address format and the shipping label being trackable by the item transport server and outputting to the mobile communication device, intermittent statuses of the item based on information received from the item transport server;

a third component, responsive to the order state transitioning to the first state, to charge, using the processor of the object redemption server, a buyer for the item using the payment information entered by the buyer into the single user interface displayed on the mobile device, wherein the payment information is formatted by the object redemption server and sent to the payment server for processing and holding the processed payment information until the order state of the state controller has transitioned to a third state; and a fourth component to automatically detect whether an exception event has occurred and responsive to detecting the exception event, the fourth component initiates processing of the exception event by transitioning the order state to an exception state, wherein the second component transitions, using the processor of the object redemption server, the order state of the state controller to a second state when the updated tracking status indicates receipt from a transport server indicative that the item has transferred possession from the seller to a shipper, wherein the second component transitions, using the processor of the object redemption server, the order state of the state controller to a delivery state when the updated tracking status indicates delivery from the transport server indicative that the item has transferred possession from the shipper to the buyer, and wherein the third component, responsive to the order state transitioning to the delivery state, releases, using the processor of the object redemption server, a payment to the seller as charged to the buyer, the payment to the seller being processed by the payment server and being based on seller payment information retrieved from storage and being previously entered by the seller through a seller user interface on a seller's mobile communication device and stored under a seller profile.

* * * * *